(12) United States Patent
Fitton et al.

(10) Patent No.: US 7,761,050 B2
(45) Date of Patent: Jul. 20, 2010

(54) COMMUNICATION NETWORK FOR INDOOR ENVIRONMENT

(75) Inventors: Michael Philip Fitton, Bristol (GB); Douglas John Gargin, Bristol (GB); Siew Chung Leong, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 426 days.

(21) Appl. No.: 11/749,653

(22) Filed: May 16, 2007

(65) Prior Publication Data

US 2007/0224931 A1    Sep. 27, 2007

Related U.S. Application Data

(63) Continuation of application No. 10/777,754, filed on Feb. 13, 2004, now abandoned.

(30) Foreign Application Priority Data

May 14, 2003 (GB) ................... 0303471.7
Feb. 3, 2004 (GB) ................... 0402342.0

(51) Int. Cl.
    *H04B 7/14* (2006.01)
(52) U.S. Cl. ................. 455/7; 455/434; 455/13.1; 455/452.2
(58) Field of Classification Search ........... 455/7, 455/11.1, 10, 13.1, 13.3, 13.4, 504, 513, 455/515, 63.4, 63.2, 464, 452.1, 452.2, 25, 455/562.1, 434, 525; 370/331
See application file for complete search history.

(56) References Cited

U.S. PATENT DOCUMENTS 6,132,306 A * 10/2000 Trompower ................. 455/11.1
7,035,539 B2   4/2006 Gumaste 2002/0042290 A1   4/2002 Williams et al.

(Continued)

FOREIGN PATENT DOCUMENTS

EP        0 869 630        10/1998

(Continued)

OTHER PUBLICATIONS

Mischa Dohler, et al., "Link Capacity Analysis for Virtual Antenna Arrays", IEEE, 2002, pp. 440-443 (Mar. 2002).

(Continued)

*Primary Examiner*—John Lee
(74) *Attorney, Agent, or Firm*—Oblon, Spivak, McClelland, Maier & Neustadt, L.L.P.

(57) ABSTRACT

The present invention relates to wireless communication networks particularly for indoor deployment, in which there typically directly exists a rapidly changing multipath propagation environment with limited opportunities for line of sight wireless communication. The present invention provides A wireless communications network for communicating with a mobile terminal; comprising: a number of repeater points each comprising means for communicating with the mobile terminal; an access point comprising means for communicating with the repeater points; the repeater points further comprising means for relaying signals between the terminal and the access point; means for determining a quality measure of signals sent by the terminal and received by the access point via the repeater points; means for selecting one or more repeater points to relay transmission signals from the access point to the terminal, said selection based on said quality measures of the terminal signals received by the access point.

14 Claims, 7 Drawing Sheets

U.S. PATENT DOCUMENTS

| | | | |
|---|---|---|---|
| 2002/0164997 | A1 | 11/2002 | Parry |
| 2003/0036408 | A1 | 2/2003 | Johansson et al. |
| 2004/0146013 | A1 | 7/2004 | Song et al. |
| 2005/0153719 | A1* | 7/2005 | Bims .......................... 455/466 |
| 2006/0041680 | A1* | 2/2006 | Proctor, Jr. et al. .......... 709/238 |

FOREIGN PATENT DOCUMENTS

| | | |
|---|---|---|
| GB | 2 307 375 | 5/1997 |
| JP | 8-84106 | 3/1996 |
| JP | 11-168422 | 6/1999 |
| WO | WO 97/13386 | 4/1997 |

OTHER PUBLICATIONS

Peter Chow, et al., "Performance Advantages of Distributed Antennas in Indoor Wireless Communication Systems", IEEE, 1994, pp. 1522-1526 (Sep. 1994).

* cited by examiner

COMMUNICATION NETWORK FOR INDOOR ENVIRONMENT

CROSS-REFERENCE TO RELATED APPLICATIONS

This application is a Continuation of and claims the benefit of priority under 35 USC §120 from U.S. Ser. No. 10/777,754, filed Feb. 13, 2004, and claims the benefit of priority under 35 U.S.C. §119 from United Kingdom Patent Application No. 0303471.7, filed Feb. 14, 2003, and United Kingdom Patent Application No. 0402342.0, filed Feb. 3, 2004, the entire contents of each which are incorporated herein by reference.

FIELD OF THE INVENTION

The present invention relates to wireless communication networks particularly for indoor deployment, in which there typically directly exists a rapidly changing multipath propagation environment with limited opportunities for line of sight wireless communication.

BACKGROUND OF THE INVENTION

Indoor environments present a number of challenges for wireless communications network deployment. Because of object clutter and the walls and ceilings of the rooms in an indoor environment, signal reflections off these surfaces present a complex multipath propagation environment for wireless signals. Because people move around within these environments, this also affects the propagation environment in a highly dynamic manner, making adequate signal reception challenging.

One way in which this problem is addressed is with the use of diverse antennas which are spaced apart from each other to receive different signal components of the originally transmitted signal. Either the best signal component is selected or some combination of the signal components from each antenna is generated to give an improved received signal. However the signal combination is not straightforward and is complicated by the delay spread introduced by unequal cable lengths to the different antennas. In a highly dynamic propagation environment such as inside a room, the selection or combination process is constantly having to update based on these changing conditions which requires a high processing load. Such diversity antenna approaches are shown in EP869630, and "Performance Advantages of Distributed Antennas in Indoor Wireless Communication Systems", IEEE Vehicular Technology Conference, volume 3, pp 1522-1526, Jun. 1994.

Another method of addressing the problems of this type of environment is by using terminals within the environment as repeaters which relay transmission signals between each other and an access point antenna to provide a series of line of sight (LOS) signal propagation paths between a particular terminal and the access point antenna. Such a system is described in "Link Capacity Analysis for Virtual Antenna Arrays" by Mischa Dohler, Jose Dominguez, Hamid Aghvami in IEEEE Vehicular Technology Conference, Fall 2002 IEEEE 56$^{th}$, volume 1, pp 440-443, 2002. However, this sort of technique is highly dependent on the availability of mobile devices in the working proximity and as such the link quality is not always guaranteed as the mobile devices come and go.

SUMMARY OF THE INVENTION

In general terms the present invention provides a wireless communication network for communicating with mobile terminals in an indoor environment; the network comprising an access point and a plurality of repeater points each having means for communicating with the mobile terminals; and the access point and repeater points also having means for communicating with each other. The repeater points also have means for relaying communications between the terminal and the access point. Preferably the access point and repeater points are arranged to have line of sight signal propagation between each other, and preferably utilise highly directional or narrow beam antennas directed at respective other points. Alternatively, cabling may be used between the access point and the repeater points, providing for example radio over fibre (RoF) or other low loss cable implementations. This provides more reliable links and does away with the need for directional antennas.

Each repeater point is arranged to relay signals received by the terminal to the access point. The access point also preferably comprises means for receiving signals directly from the mobile terminal. Thus, the access point substantially simultaneously receives the same communication signal from the terminal via a number of routes, that is directly to the access point and via the various repeater points. Thus the network has a number of repeaters having overlapping coverage areas in order to wirelessly communicate with the mobile terminal from a number of different points within the overall network coverage area. This mitigates the problem of short term shadowing, which in the case of human bodies can be in the order of 18 dB or more at millimeter wavelengths. Preferably the repeater point coverage areas are substantially co-located.

The access point comprises also means for selecting one of these signal paths between it and the mobile terminal for transmission of signals to the mobile terminal. Signals transmitted by the access point to the terminal are then transmitted along the selected path to ensure optimum communication between the access point and the terminal. A quality measure of the signals received by the access point is used to determine which path (or paths) to use to transmit signals back to the mobile terminal. Preferably LOS signal paths are used to transmit signals to the terminal from the access point.

Because the access point is simultaneously receiving signals transmitted by the terminal through a number of routes, it is able to select the best route and switch its transmission path accordingly. This can be done without the need for handover between the terminal and one of the repeater points (or the access point) as done in the prior art. Thus, the selection of an appropriate transmission path is very rapid and requires little processing or control signal overhead compared with prior art methods. It is therefore highly suited to the indoor environment which as previously described has a propagation environment with which changes rapidly. Thus as a mobile terminal moves around a room and has its line of sight path with one repeater point blocked, the access point can rapidly switch to another path either through another repeater point or directly to the access point to ensure a high quality transmission link between the mobile terminal and the access point.

In particular, in one aspect the present invention provides a wireless communication network for communicating with a mobile terminal; comprising: an access point and a number of repeater points, the access point and repeater points each comprising means for communicating with the mobile terminal; the repeater points further comprising means for communicating with said access point and means for relaying communications received by said terminal to said access points such that signals received from the terminal by each repeater point are substantially, simultaneously transmitted to said access point; the access point further comprising means for receiving transmission from each repeater point and means for selecting one or more of said repeaters and means for transmitting to said terminal via said selected repeater point.

Preferably the repeater points and access point are located within the room such that there is a line of sight path between each repeater point and the access point. More preferably, the repeater points are located such that there is a line of sight path between each repeater point. Alternatively cabling such as RoF may be used.

Preferably the selection of a repeater point by the access point is based on a predetermined quality such as signal-to-noise ratio of the two links, one between the repeater point and the mobile terminal and the other between the repeater point and the access point. Alternatively the selection may be based on a predetermined quality of the mobile terminal transmission received by the access point.

Preferably the network comprises at least four repeater points. Preferably the access point is located on the ceiling, and the repeater points around walls of a room. Preferably the repeater points are located at substantially the same height and substantially equidistant from each other such that the repeater points and access point form a 3D space; preferably a pyramid. This provides a number of overlapping coverage regions for the terminal to use depending on the corresponding repeater or access points' signal strength or other measure at the terminal's location.

Preferably signals between the access and repeater points and the mobile terminals are in the millimeter waveband, for example 60 GHz. The frequency of communication on the repeater terminal link may be the same or different from that used on the repeater to access point link. In order to reduce interference, communication to and from the terminal (or the repeater to access point link) may be frequency separated (FDD) or time divided (TDD).

Preferably the transmission powers of the repeater points (and access point) are controlled in order to reduce co-channel interference. The extent to which the transmission power is reduced will depend on the room geometries and object clutter in the room as well, as would be apparent to those skilled in the art.

In another aspect the present invention provides an access point for a wireless communications network comprising a number of repeaters for communicating with a mobile terminal; comprising: means for receiving transmissions from each repeater point and means for selecting one of said repeaters and means for transmitting to said terminal via said selected repeater point.

In another aspect the present invention provides a repeater point for a wireless communications network comprising an access point and a number of repeater points for communicating with a mobile terminal; comprising: means for communicating with the mobile terminal; means for communicating with the access point and means for relaying signals received by said terminal to said access point; means for receiving selected repeater point information from the access point, and either transmitting or not transmitting with the terminal as appropriate.

In a further alternative, the network may comprise two or more repeaters in one "link" between the first repeater and the access point.

In a further aspect the present invention provides a wireless communications network for communicating with a mobile terminal; comprising: a number of repeater points each comprising means for communicating with the mobile terminal; an access point comprising means for communicating with the repeater points; the repeater points further comprising means for relaying signals between the terminal and the access point; means for determining a quality measure of signals sent by the terminal and received by the access point via the repeater points; means for selecting one or more repeater points to relay transmission signals from the access point to the terminal, said selection based on said quality measures of the terminal signals received by the access point.

Preferably the selection means selects one or more repeater points having a received signal quality measure above a predetermined threshold, said threshold corresponding to a line of sight signal path between the terminal and the access point via one or more repeater points.

Preferably the access and repeater points are located to form a pyramid in 3D space.

In yet another aspect the present invention provides an access point for a wireless communications network comprising a number of repeaters for communicating with a mobile terminal; comprising: means for determining a quality measure of signals sent by the terminal and received by the access point via the repeater points; means for selecting one or more repeater points to relay transmission signals from the access point to the terminal, said selection based on said quality measures of the terminal signals received by the access point.

Preferably the selection means selects one or more repeater points having a received signal quality measure above a predetermined threshold, said threshold corresponding to a line of sight signal path between the terminal and the access point via one or more repeater points.

Preferably the access point further comprises means for communicating directly with the mobile terminal and wherein the selection means is further arranged to select between said repeater points and the direct access point communication means for transmitting to said terminal.

In a yet further aspect the present invention provides a repeater point for a wireless communications network comprising an access point and a number of repeater points for communicating with a mobile terminal; comprising: means for communicating with the mobile terminal and means for communicating with the access point in order to relay signals between said terminal and said access point; means for determining a quality measure of signals sent by the terminal and received by the repeater point, and means for forwarding said quality measure to said access point.

BRIEF DESCRIPTION OF THE DRAWINGS

Embodiments of the present invention will now be described in detail with reference to the following drawings by way of example only and without intending to be limiting, in which.

DETAILED DESCRIPTION OF THE DRAWINGS

Figure 1:
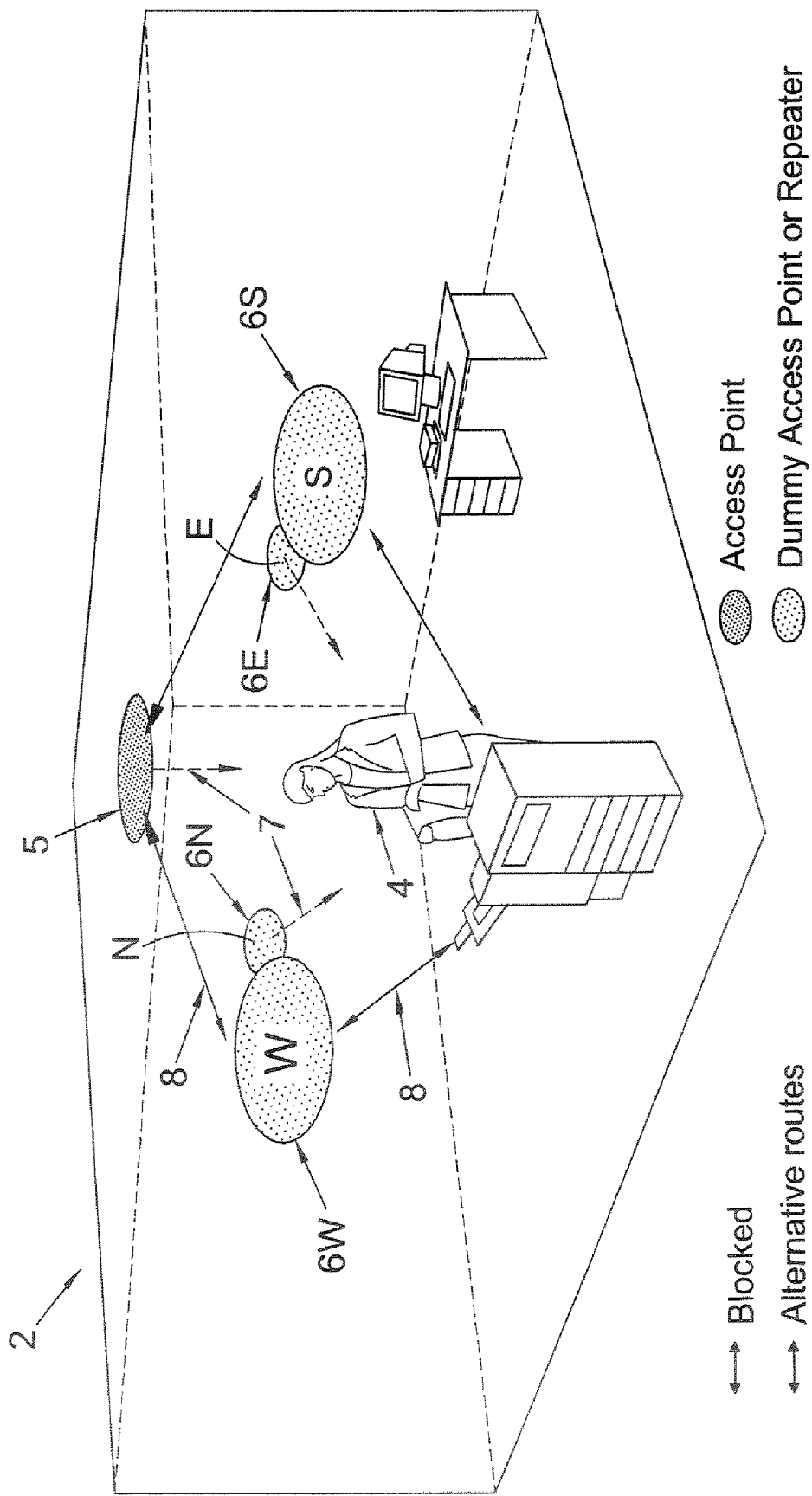
FIG. 1 shows an embodiment in which a network located about a room is communicating with a mobile terminal.

Referring to FIG. 1, a network is deployed in a room 1 having walls and ceilings as well as various office furniture as shown. Various items of furniture may comprise wireless terminals 3, and may be movable about the room 1. The room 1 will also periodically contain people 4 which act as barriers for through propagation for wireless signals particularly and high frequencies in the millimeter waveband for example. A network 2 is distributed about the room 1 and comprises an access point 5 mounted in or on the ceiling and four repeater points 6W, 6N, 6E, and 6S mounted in or on the walls of the room. The access point 5 and repeater points 6 are preferably distributed uniformly about the room 1, however the exact distribution will depend on the parameters of the room 1 as well as any static office furniture or other items. Each repeater point and the access point are able to communicate with a mobile wireless terminal 3, however the ability of each point to communicate with this terminal 3 at any particular time will depend on the changing environment within the room. Especially at high frequencies, it is preferred to have line of sight (LOS) signal propagation between the mobile terminal 3 and one of the points (5, 6) of the network 2.

Dashed arrows 7 indicate that the LOS path between the mobile terminal 3 and a network point 5, 6 is blocked by the movable object 4. Solid arrows 8 indicate clear LOS paths between the mobile terminal 3 and points of the network 2. As shown in this particular example, there are two LOS paths between the mobile terminal and repeater points 6W and 6S on the network.

The repeater points 6 are located such that they have a LOS path to the access point 5, thus in the example there are two routes between the mobile terminal 3 and the access point 5 having LOS paths. As the person 4 moves around the room, it can be seen that the distribution of LOS paths changes. As this occurs the network 2 is configured to select the best route between a mobile terminal 3 and the access point 5, either directly between the terminal 3 and the access points or via one of the repeater points 6. Similarly a mobile terminal carried by the person 4 will communicate with the access point 5 via the most appropriate route depending on the person's location as well as the location of other blocking objects within the room 1. Thus even in a room crowded with people and/or other objects, it is highly likely that a mobile terminal 3 within such an environment will be able to obtain a LOS route to the access point either directly or via one of the repeater points 6. This is so irrespective of movement of objects 4 within the room 1.

Figure 2A:
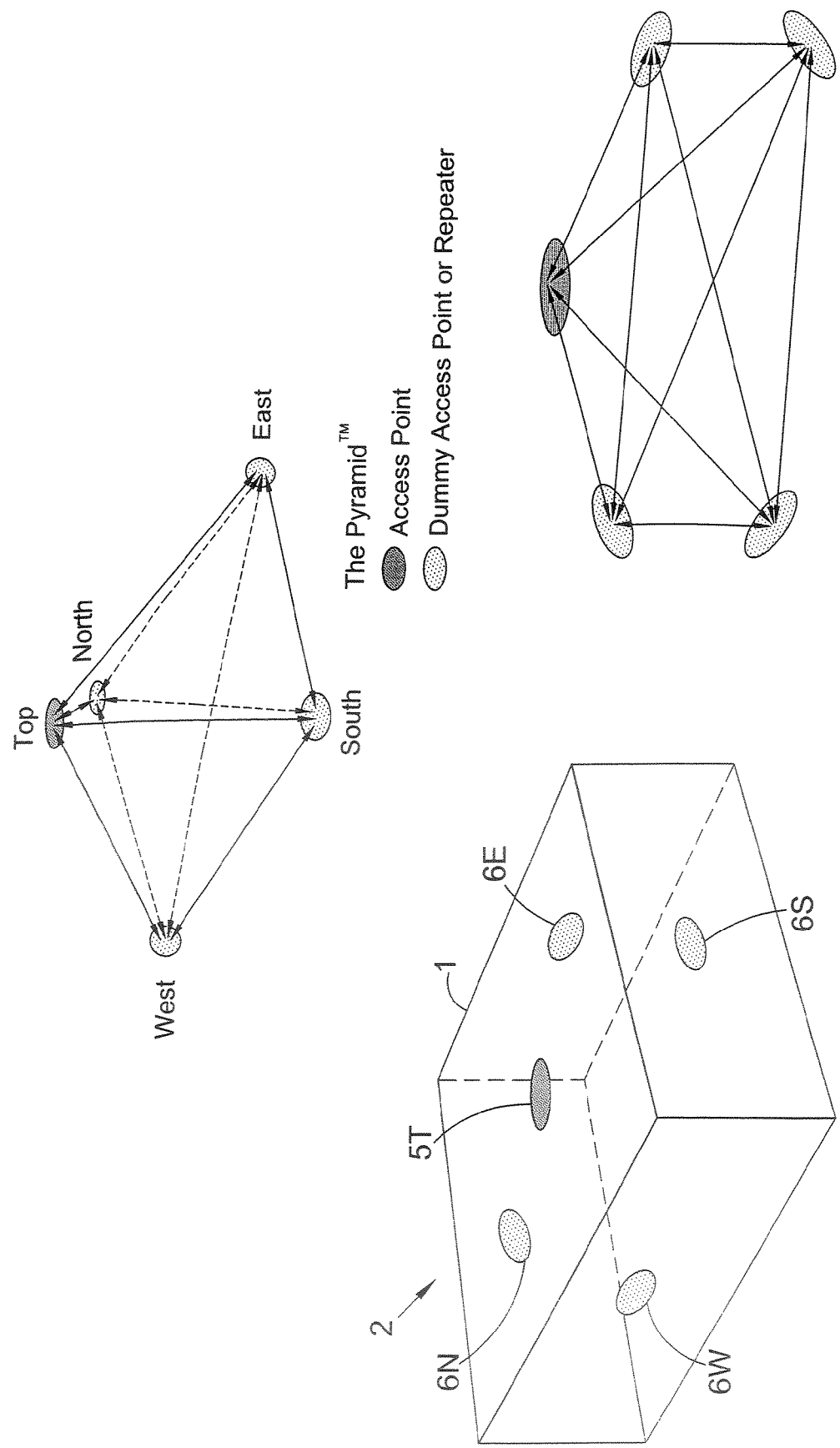
FIGS. 2a, 2b, 2c and 2d show various location layout arrangements for the various parts of the embodiment.
Figure 2C:
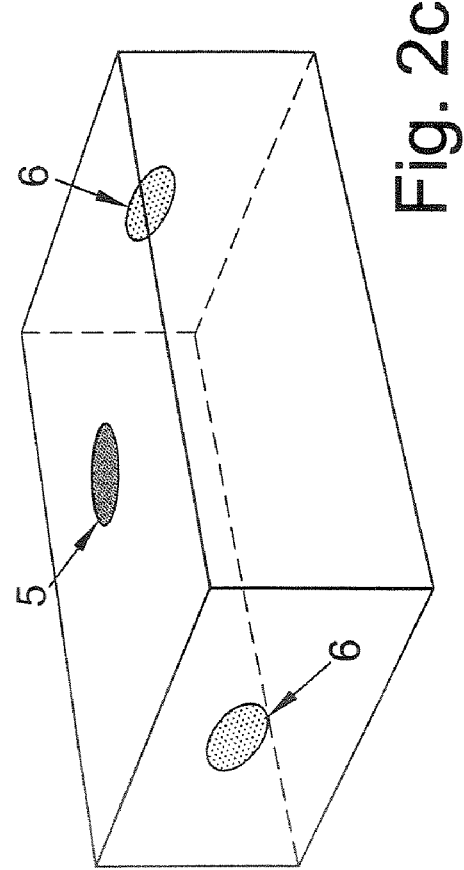

FIG. 2*a* shows a pyramid structure for an indoor environment or room 1 having the access point of the network 2 located on the ceiling of the room, and having four repeater points 6, one located on each wall of the room 1. The repeater points 6 are located to have an LOS signal path to the access point 5, and preferably also to each other. Preferably the repeater points 6 are located equidistant with respect to each other and at approximately the same height up the wall to form a square or plane through the walls of the room. In combination with the access point 5, the network 2 then comprises a pyramid of wireless points 5, 6 with which a mobile terminal inside the room 1 can communicate. Additional repeater points 6 may be added to the room 1, depending on its size, geometry, and expected density of moving object 4. Less than four repeater points 6 may also be employed depending on the room 1 configuration, for example in a short corridor one or two repeater points 6 and an access point 5 may be sufficient—see FIG. 2*c*.

Figure 2B:
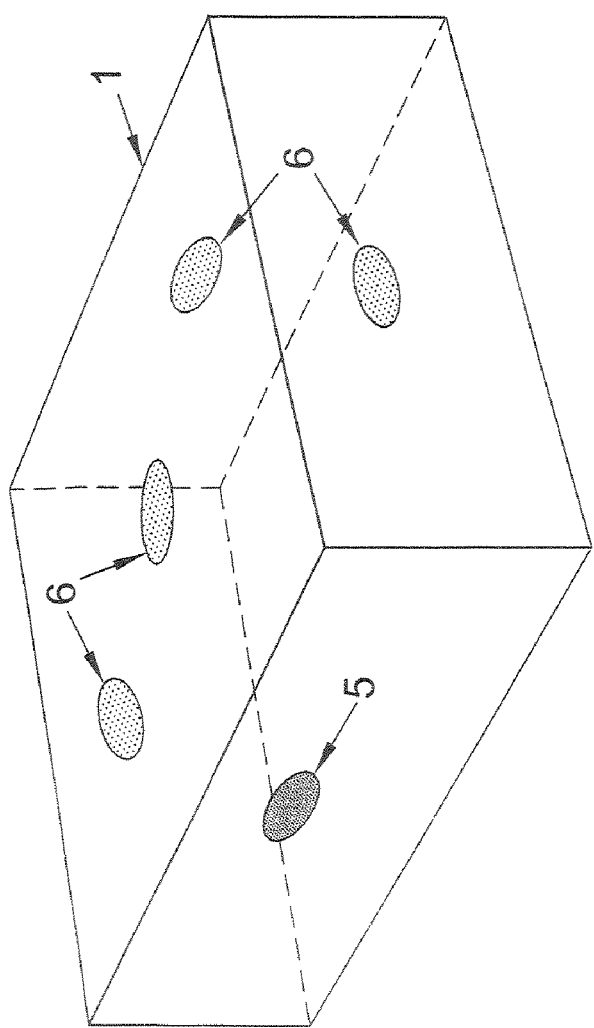

FIG. 2*b* shows an alternative arrangement employing a pyramid structure, but in which the access point 5 is located on a wall of a room 1, and one of the repeater points 6 is located on the ceiling.

Figure 2D:
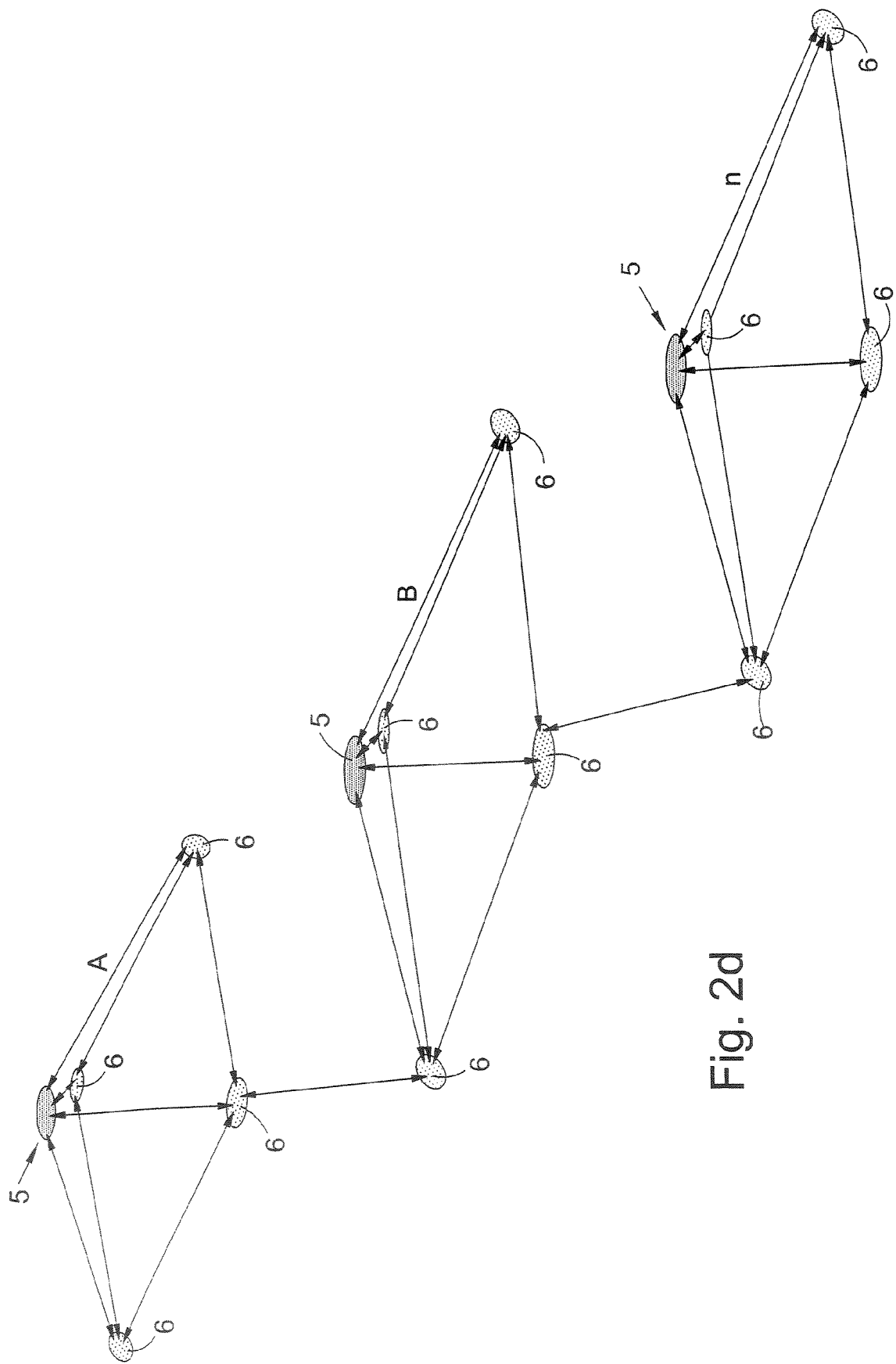

FIG. 2*d* shows a multiple pyramid structure for extended coverage such as might be required in large rooms or rooms having a high ceiling or significant and varied shadowing. Thus a number of adjacent network pyramids can be used to cater for larger room dimensions and more complex indoor environments, such as shopping complexes and airports. Each Pyramid network can be identified by a unique I.D. in the packet header. Packets from another network can thus be identified and forwarded to the nearest AP 5. Thus a stray signal from a terminal in an adjacent network which is received by a repeater 6 in the present network can be forwarded to the access point 5 of the present network, and passed on from there if necessary to the access point of the adjacent network.

The pyramid may also be arranged such that the repeaters 6 has the same height as the access point 5.

Figure 3:
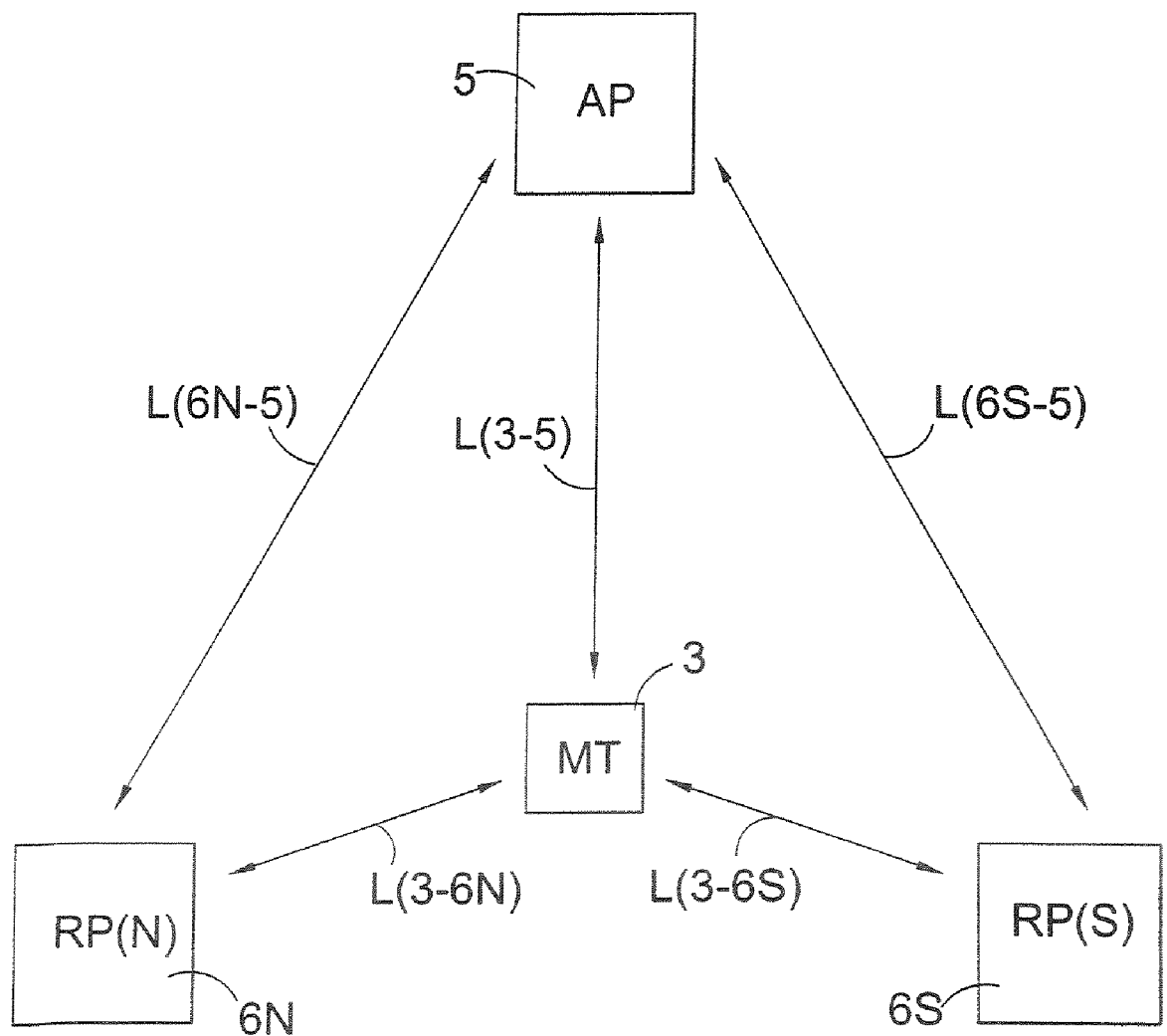
FIG. 3 illustrates signal paths within the embodiment.

FIG. 3 shows part of a pyramid network structure for simplicity and comprising the access point 5 and two of the repeater points 6N and 6S. Also shown is a mobile terminal 3 and the various LOS wireless paths, between each of these elements. Depending on the indoor environment, the mobile terminal 3 may have a LOS signal path L(3-5) to the access point 5, as well as one to each of the repeater points 6N and 6S, respectively paths L(3-6N) and L(3-6S). In addition there are line of sight signal paths between the repeater points 6N and 6S and the access point 5, respectively paths L(6N-5) and L(6S-5). Thus the mobile terminal 3 is provided with three potential line of sight routes to the access point 5—these are direct signal link L(3-5), twin links L(3-6N) and L(6N-5) through repeater point 6N, and twin links L(3-6*s*) and L(6S-5) through repeater point 6S. If one of these links or routes between the terminal 3 and access point 5 is blocked by a moving object, then the other routes are available to be used as an alternative. In addition, if L(6N-5) or L(6S-5) is being blocked the mobile terminal 3 can also reach the access point via an indirect path, L(6N-6S) between the repeater 6N and 6S, forming more than two links, respectively paths L(3-6N), L(6N-6S) and L(6S-5) or L(3-6S), L(6N-6S) and L(6N-5).

The network 2 is arranged such that each of the network wireless points 5 and 6 receive signals transmitted by the mobile terminal 3. If received by a repeater point 6, these received signals are then relayed on to the access point 5. The access point 5 then either selects the best route for receiving signals from the mobile terminal 3, or combines these received signals to generate an improved composite received signal. The access point 5 uses the determination of the best received signal route to send transmission signals from the access point 5 to the mobile terminal 3. Thus although signals transmitted by the mobile terminal 3 are received by the access point 5 through numerous signal routes, one of these routes may be selected for transmitting back to the mobile terminal 3. The transmission route from the access point 5 to the mobile terminal 3 may then be rapidly changed if the current route is suddenly blocked by a moving object. Use of one transmission route has an added advantage to avoid co-channel interference with another unintended mobile terminal at the receiving mobile terminal 3. More than one transmission route can also be utilised, however this could increase complexity at the receiving mobile terminal 3. In this case, the mobile terminal 3 may adopt a selection or combining process with antenna diversity.

Figure 4:
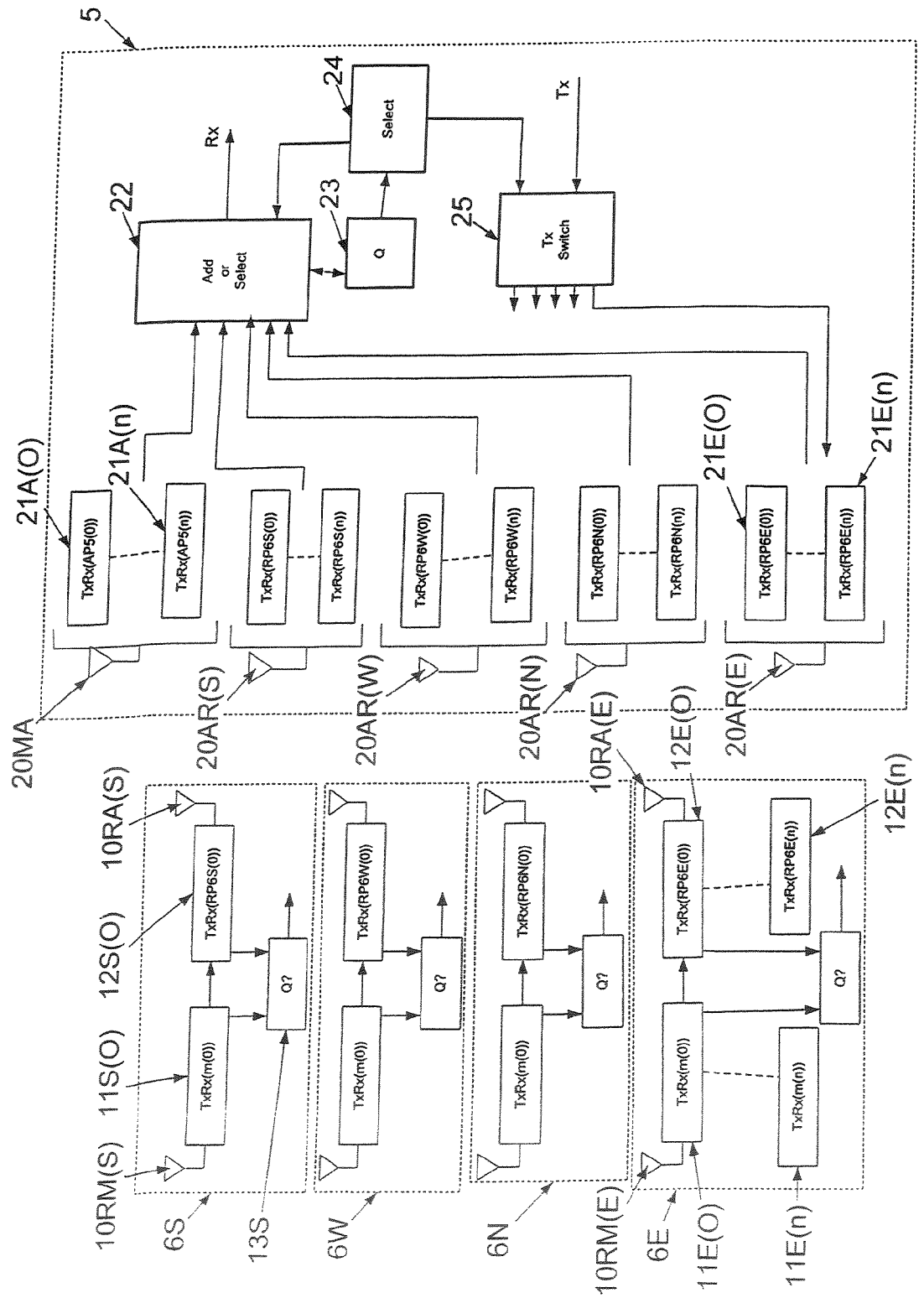
FIG. 4 is a schematic of the apparatus of the embodiment.

Referring to FIG. 4 a schematic of the apparatus of the network 2 is shown. The network 2 comprises an access point 5 and a number of repeater points 6 which wirelessly connect to one or more mobile terminals (not shown). Each repeater point (for example 6S) comprises two antennas 10RM(S) and 10RA(S) for wirelessly coupling between the repeater points 6S and a mobile terminal 3, and the repeater point 6S and the access point 5 respectively. The antennas are preferably directional antennas and more preferably comprise an antenna array and beam forming circuitry in order to control the beamwidth and thus limit interference with adjacent network points 5 and 6. The antenna array 10RA(S) is arranged to produce a narrow beam which is directed at a corresponding antenna array 20AR(S) on the access point 5, the narrow beam being centred around the LOS signal path between these two network points 5 and 6S.

The repeater points 6 also comprises transceiver circuitry 11 for receiving and sending wireless signals between the repeater point 6 and a mobile terminal 3. The repeater points 6 may comprise a number of such transceiver circuitry to enable the repeater point 6 to communicate with a number of mobile terminals 3. Multiple transceiver circuitry of this sort is shown with respect to repeater point 6E. Each such transceiver circuit 11E(0)-11E(N) coupled to the antenna or antenna array 10RA(E) for communicating with a mobile terminal 3. These transceiver circuits are coupled to corresponding secondary transceiver circuits 12E(0)-12E(N). Note that for simplicity, only one secondary transceiver circuit 12E is shown for the other repeater points 6. The secondary transceiver circuits 12E communicate through antenna array 10RA(E) with the access point 5 to relay any communications from a mobile terminal 3 received by the repeater point 6E.

The secondary transceiver circuitry 12 may simply transmit and receive signals from the mobile terminal to the access point 5 using the same channel frequency and/or code and/or time slot, relying the directional nature of the antenna arrangements 10RA and 20AR to avoid interference with the same channel used to communicate between the repeater point 6 and the mobile terminal 3. Alternatively the secondary transceiver circuitry 12 may be arranged to change the channel parameters such as frequency, time slot, code or a combination of these when forwarding communications to the access point 5.

Note that communications between a particular mobile terminal 3 (0) and each available repeater point (say 6S and 6N) will be using the same channel, that is each repeater point 6S and 6N will receive signals from the mobile terminal 3(0) over the same frequency, time slot, and code if appropriate. How this signal is then relayed to the access points by the different repeater points 6 involved will depend on system configuration, but as described above in the simplest configuration this may simply rely on the spatial channels provided by highly directional antenna arrangements.

The repeater points 6 may also comprise a channel quality determining circuit 13 which determines one or more parameters for each link between the mobile terminal and the access point; that is the wireless link between the mobile terminal 3 and the repeater point 6. Such link quality could be measured by received signal strength and interference measurements as are well known. The access point 5 measures the link quality between each repeater point 6 and the access point 5 using a similar channel quality determining circuit 23. A measure of the mobile to repeater link involving the repeater point 6 is periodically forwarded to the access point 5, for example by embedding this in a packet header. A combined measure of each combined link can then be determined by the access point 5. Alternatively or in addition, a measure of the combined link is made just at the access point, for example using signal strength and interference measurements of the signal received by the access point 5. This keeps the repeater points 6 as simple and cheap as possible.

Preferably the repeater points 6 also comprise an amplifier in order to amplify and forward receive signals.

The access point 5 comprises an antenna 20 AR(S), 20AR(W), 20AR(N) and 20AR(E) for each of the repeater points 6S-6E, as well as an antenna 20MA for communication directly with the mobile terminal 3. Each antenna or antenna element 20MA, 20AR(S), 20AR(W), 20AR(N), and 20AR(E) are coupled to one or more respective transceiver circuits 21. For example antenna 20MA is coupled to transceiver circuits 21A(0), 21A(1), . . . , 21A(N), each corresponding to a particular channel which is useable by a mobile terminal 3. Thus the access point 5 may communication directly with N mobile terminals 3. Similarly, referring to antenna 20AR(E), this is arranged to communicate with repeater point 6E either by directional antenna alignment or by a dedicated channel for this communication link. At the access point 5, this antenna 20AR(E) is coupled to one or more transceiver circuits 21E(0)-21E(N) corresponding to multiple transceiver circuits 11E(0)-11E(N) and 12E(0)-12E(N) in the repeater point 6E; which in turn corresponds to the number of mobile terminals 3(0)-3(N) which that repeater point 6E can communicate with.

Considering a single mobile terminal 3(0) an add or select function 22 receives signals from the mobile terminal 3(0) via the various available signal paths; that is either directly from the mobile to the access point through antenna 20MA and transceiver 21A(0) and/or one or more of the repeater points, for example 6E through antenna 10RM(E), transceiver circuits 11E(0), secondary transceiver circuit 12E(0), antenna 10RA(E), wireless link to antenna 20AR(E) of the access point 5, transceiver circuit 21E(0) through to the add or select function 22.

The add or select function 22 either combines the received signals to produce a composite received signal Rx or alternatively selects the best received signal path or route based on the received quality of link indications sent by the repeater points 6, which as described above are determined by their quality of link functions 13. Preferably maximum ratio combining is used, although selective ration combining has simplicity advantages. The access point 5 will also have a similar quality of link function 13 for its direct link to the mobile terminal through antenna 20MA (this is shown as 23). A select function 24 determines the best wireless route for signals between the mobile terminal 3 and the access point 5. The selection function outputs this information to a transmission switch function 25, and optionally to the add or select function 22 when in select mode.

The transmission switch function 25 switches the incoming transmission signal Tx to an appropriate transceiver to be forwarded on either directly from the access point to the mobile terminal or through one of the repeater points 6E as shown. Because only one wireless link route is used for transmission, co-channel interference associated with the mobile terminal 3 receiving this signal from the access point is reduced.

Figure 5:
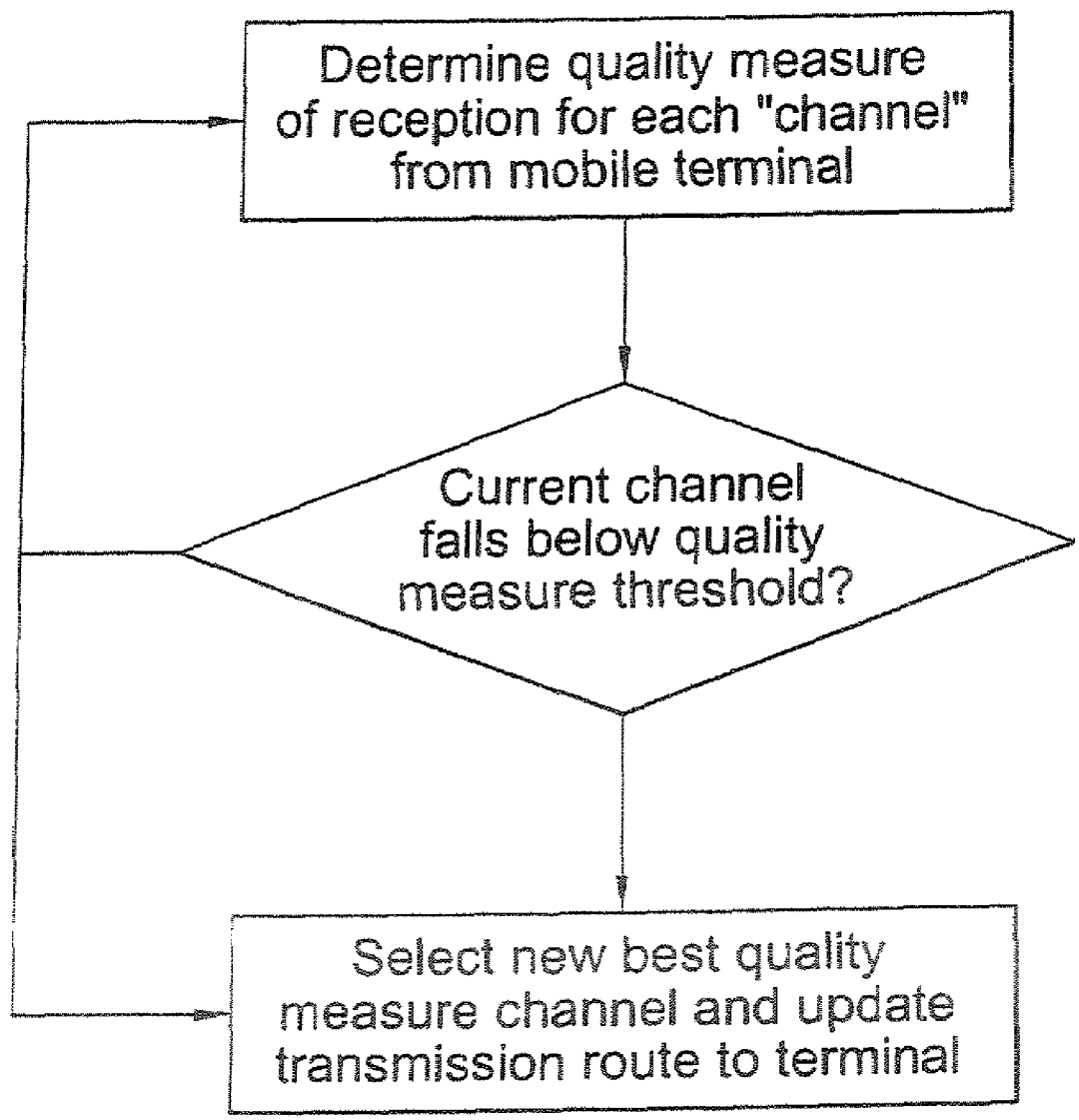
FIG. 5 is a flow diagram of a selection method.

The select function 24 monitors the quality measures of the various wireless routes to the mobile terminal 3 in real time as these measurements can change very rapidly, for example as a person moves into the line of sight of the current favoured wireless route. In this case an alternative route must be quickly found. A method of changing wireless routes is shown in FIG. 5.

The access point 5 can also dynamically adjust the transmission output power according to quality measures received from the repeater points 6 or determined by the access point 5 itself. This may be used together with knowledge of the physical locations of the repeaters 6 and access point 5 with respect to each other to minimise interference by limiting the signal strength of the signal received by one repeater from another. For power constrained systems, it is useful to note the number of bits a system may transmit for every Joule of energy used. The bits/Joule ratio can be computed with the following relation:

$$\frac{C\left[\frac{\text{bits}}{\text{second} * \text{Hz}}\right] \times B[\text{Hz}]}{(P_{AP} + P_{relay})\left[\frac{\text{Joule}}{\text{second}}\right]} = u\left[\frac{\text{bits}}{\text{Joule}}\right], \quad \text{(Eq. 2)}$$

where C is the capacity, B the bandwidth, $P_{AP}$ and $P_{relay}$ the access point 5's and repeaters 6's transmitted powers respectively, and u is the transmitted bits per unit energy. With this as a guide, suitable algorithms can thus be formulated to control transmission powers at the access point 5 and the repeater points 6 so to obtain the maximum number of transmitted bits with the least amount of energy.

The system's raw capacity when each of the repeaters 6 preferably amplifies and forward may then be defined as:

$$C = \frac{1}{2}\log_2\left\{1 + SNR_{s-d} + \sum_{n=1}^{4}\left(\frac{SNR_{s-r_n} SNR_{r_n-d}}{1 + SNR_{s-r_n} SNR_{r_n-d}}\right)\right\}, \quad \text{(Eq. 1)}$$

where s, d and r denotes the source, destination and relay stations respectively. SNR is the signal to noise ratio. In the uplink case, the source is the mobile terminal and the destination—access point 5. In the downlink case, the reverse is true. The quantity ½ accounts for the additional time required for transmitted signals to reach the destination via relayed routes, assuming TDD mode for a single user.

Preferably a MIMO channel is established be teen the repeaters and the terminal.

The antennas 10RM used by the repeaters 6 to communicate with the mobile terminal are preferably of approximately 120 degrees beam-width. In a further arrangement, mmW dielectric lens antennas are used to limit interference from the directional beams from other repeaters 6. The lens antennas provide a circular uniform symmetrical power pattern throughout its coverage, and are cheap and easy to fabricate.

An advantage of this arrangement is that there is no need to perform hand over between pico-cells between the wireless terminal 3 and repeater points 6 and the access point 5. Instead the transmission signal Tx is quickly re-routed to a new best wireless route through either repeater 6S, 6W, 6N or directly from access point 5. Thus for example there is no need to change the carrier frequency of operation.

Various algorithms for selecting the best wireless route are possible, for example the determination may be made simply by the sum of received signal strengths on the mobile terminal to repeater and repeater to access point wireless links, provided a predetermined minimum signal strength is available on each link.

The embodiment has a number of advantages including simplifying the deployment of wireless networks in indoor environments, whilst at the same time significantly improving the probability of high quality links at a given time.

Preferably the RP 6 is as simple as possible, preferably using passive circuits in which power supply is not needed. Form factor is another advantage, and the antenna array could be made very small.

Alternatively the RP 6 may include signal link quality measurement functionality as well as the functionality required to report this to the AP 5. Further the RP 6 may include a switch-off function if it is not selected for transmission to the terminal 3 by the AP 5. Although an advantage of maintaining the RP's 6 on is that weak stray signals, perhaps from adjacent pyramid networks could be relayed on.

In an alternative arrangement, cable links are provided between the access point 5 and the repeaters 6. Preferably a radio over (optical) fibre RoF system is used incorporating RF to optical front ends, however other systems could alternatively be used. Low loss oxygen free high grade copper cables may also be used. This provides a more reliable link between these components and eliminates interference from the terminal to repeater wireless links. It also avoids the need for and aligning of directional antennas.

Each network may also be coupled with another similar network of repeaters 6 and an access point 5 to form a larger network. Each network (or access point 5) will have its own unique network ID and terminals that move between these will require handover. A controller (not shown) will control this in known manner.

Embodiments of the present invention have been described herein. Alterations and modifications as would be obvious to those skilled in the art are intended to be incorporated within the scope hereof.

The invention claimed is:

1. A wireless communications network for communicating with a mobile terminal, comprising:
    a number of repeater points having overlapping coverage areas and each comprising transceivers for communicating wirelessly with the mobile terminal;
    an access point comprising transceivers for communicating with the repeater points;
    the repeater points further comprising means for relaying signals between the mobile terminal and the access point;
    a signal quality measurement apparatus for determining a quality measure of signals sent by the mobile terminal and received by the access point via the repeater points; and
    a selector for selecting one or more repeater points to relay transmission signals from the access point to the mobile terminal, said selection based on said quality measures of the mobile terminal signals received by the access point,
    wherein the access point further comprises a transceiver for communicating directly with the mobile terminal and wherein the selector is further arranged to select between said repeater points and the direct access point communication transceiver for transmitting to said terminal.

2. The network according to claim 1, wherein the access point transceivers comprise a wireless link between said access point and a respective one of said repeater points and having directional antennas.

3. The network according to claim 2 and arranged such that the access point has a line of sight (LOS) path to each repeater point and wherein the access point and the repeater points each comprises directional antennas.

4. The network according to claim 1, wherein the access point transceivers comprise a cable link between said access point and a respective one of said repeater points.

5. The network according to claim 1, wherein the selector selects one or more repeater points having a received signal quality measure above a predetermined threshold, said threshold corresponding to a line of sight signal path between the mobile terminal and the access point via one or more repeater points.

6. The network according to claim 1, wherein the signal quality measure of a mobile terminal signal received via a repeater point is based on a predetermined quality of each combined wireless link between a respective one of said repeater points and the mobile terminal and that said repeater point and the access point.

7. The network according to claim 1, wherein the signal quality measure of a mobile terminal signal received via a repeater point is based on a predetermined quality of said received signals.

8. The network according to claim 1, wherein the access and repeater points are located such that lines connecting the repeater points to each other and to the access point form a shape of a pyramid in 3D space.

9. The network according to claim 1, wherein at least one of the repeater points comprises:
   a signal quality measurement apparatus for determining a quality measure of signals sent by the mobile terminal and received by the repeater point, and arranged to forward said quality measure to said access point; and
   a transmission power controller for controlling transmission power of said repeater point.

10. An access point for a wireless communications network comprising a number of repeater points for communicating with a mobile terminal, comprising:
    transceivers for communicating with the repeater points;
    a signal quality measurement apparatus for determining a quality measure of signals sent by the mobile terminal and received by the access point via the repeater points; and
    a selector for selecting one or more repeater points to relay transmission signals from the access point to the mobile terminal, said selection based on said quality measures of the mobile terminal signals received by the access point,
    wherein the selector selects one or more repeater points having a received signal quality measure above a predetermined threshold, said threshold corresponding to a line of sight signal path between the mobile terminal and the access point via one or more repeater points.

11. The access point according to claim 10, further comprising a transceiver for communicating directly with the mobile terminal and wherein the selector is further arranged to select between said repeater points and the direct access point transceiver for transmitting to said mobile terminal.

12. The access point according to claim 10, wherein the signal quality measure of a mobile terminal signal received via a repeater point is based on a predetermined quality of each combined wireless link between a said repeater point and the terminal and that said repeater point and the access point.

13. The access point according to claim 10, wherein the signal quality measure of a mobile terminal signal received via a repeater point is based on a predetermined quality of said received signals.

14. The access point according to claim 10, further comprising directional antennas directed in use to said repeater points.

* * * * *